United States Patent
Shimada

(10) Patent No.: US 9,841,805 B2
(45) Date of Patent: Dec. 12, 2017

(54) POWER MANAGEMENT CIRCUIT AND ELECTRONIC DEVICE EMPLOYING THE SAME

(71) Applicant: ROHM CO., LTD., Ukyo-ku, Kyoto (JP)

(72) Inventor: Kazuaki Shimada, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 14/799,016

(22) Filed: Jul. 14, 2015

(65) Prior Publication Data

US 2016/0018868 A1    Jan. 21, 2016

(30) Foreign Application Priority Data

Jul. 17, 2014    (JP) .................................. 2014-147171

(51) Int. Cl.
  *G06F 1/00*    (2006.01)
  *G06F 1/32*    (2006.01)

(52) U.S. Cl.
  CPC ............ *G06F 1/324* (2013.01); *G06F 1/3212* (2013.01); *G06F 1/3293* (2013.01)

(58) Field of Classification Search
  CPC ....... G06F 1/324; G06F 1/3212; G06F 1/3293
  See application file for complete search history.

(56) References Cited

U.S. PATENT DOCUMENTS

| | | | | |
|---|---|---|---|---|
| 2003/0111911 A1* | 6/2003 | Hsu | .......................... | G06F 1/26 307/141 |
| 2006/0181244 A1* | 8/2006 | Luo | ...................... | H01M 10/441 320/128 |
| 2011/0022859 A1* | 1/2011 | More | ..................... | G06F 1/3203 713/300 |
| 2012/0131367 A1* | 5/2012 | Kamijima | ............. | H02J 7/0021 713/323 |
| 2014/0143528 A1* | 5/2014 | Tsutsui | ....................... | G06F 1/24 713/1 |
| 2015/0149798 A1* | 5/2015 | Enomoto | ............... | G06F 1/3206 713/320 |

FOREIGN PATENT DOCUMENTS

| | | |
|---|---|---|
| JP | 2009296852 A | 12/2009 |
| JP | 2013089060 A | 5/2013 |

* cited by examiner

*Primary Examiner* — Mohammed Rehman
*Assistant Examiner* — Gayathri Sampath
(74) *Attorney, Agent, or Firm* — Cantor Colburn LLP

(57) ABSTRACT

A power management circuit that controls a plurality of power circuits for generating supply voltages at least for a processor is disclosed. The circuit includes: a real time clock that generates clock signals with a predetermined frequency; a power-on terminal to which a power-on key is connected, wherein the power-on terminal receives a voltage whose level depends on whether the power-on key is pressed or not; a power-on detecting unit that monitors a voltage at the power-on terminal and asserts a start signal if it is determined using the clock signals that the power-on key is pressed and held for a predetermined time period; and a power management controller that receives a system voltage based on a battery voltage or a DC voltage from a DC power source and, upon the start signal is asserted, starts up the plurality of power circuits in a predetermined sequence using the clock signals.

12 Claims, 6 Drawing Sheets

POWER MANAGEMENT CIRCUIT AND ELECTRONIC DEVICE EMPLOYING THE SAME

CROSS-REFERENCE TO RELATED APPLICATION

The present invention claims priority under 35 U.S.C. §119 to Japanese Application No. 2014-147171, filed on Jul. 17, 2014, the entire content of which is incorporated herein by reference.

TECHNICAL FIELD

The present disclosure relates to a power management technique for managing and controlling a plurality of power circuits.

BACKGROUND

Electronic devices such as mobile phones, tablet terminals, note-type personal computers (PCs), desktop PCs, game devices, etc. may include a processor for performing operation processing such as a central processing unit (CPU), a graphics processing unit (GPU), a microcontroller, etc.

As semiconductor manufacturing processes become sophisticated, the number of peripheral circuits increases, and a demand for low power consumption continues to grow, an electronic device equipped with a processor is finely divided into tens of circuit blocks, and the supply voltage applied to each of the circuit blocks is individually controlled.

Such a device may employ a power management integrated circuit (PMIC) in order to control tens of power supply systems associated with tens of circuit blocks. The PMIC is required to accurately control tens of power sources by turning them on/off in a predetermined sequence.

FIG. 1 is a block diagram of an electronic device 1r. The electronic device 1r includes a PMIC 70, a CPU 20, a battery 30, a charging circuit 40, peripheral circuits 50, and a power-on key 60.

The battery 30 may be a lithium-ion battery, a nickel-hydrogen battery, etc., and outputs a battery voltage $V_{BAT}$. An external DC power source 2 such as an AC adaptor, a USB host, etc. is detachably connected to an external terminal EXT of the electronic device 1r, into which a DC voltage $V_{DC}$ is supplied. The charging circuit 40 receives a DC voltage $V_{DC}$ from the DC power source 2 to charge the battery 30. Further, the charging circuit 40 selects one from the battery voltage $V_{BAT}$ and the DC voltage $V_{DC}$, and outputs a system voltage $V_{SYS}$ via a system terminal SYS.

The PMIC 70 receives the system voltage $V_{SYS}$. In one embodiment, the PMIC 70 receives the system voltage $V_{SYS}$ at its power input terminal. The PMIC 70 includes a plurality of power circuits that generates supply voltages $V_{DD1}$, $V_{DD2}$, . . . , $V_{DDN}$ with regulated voltage levels, a power management controller that controls a start sequence and timing of the plurality of power circuits, and an oscillator 702. The plurality of power circuits 22 may include a step-up DC/DC converter, a step-down DC/DC converter, a step-up/step-down DC/DC converter, a charge pump circuit, a linear regulator such as a low drop output (LDO) regulator, etc. The power management controller of the PMIC 70 initiates turning on of the plurality of power circuits when a power-on signal PWRON from the CPU 20 is asserted. The starting timing and the operating time period are managed based on clock signals CLK generated by the oscillator 702.

For example, the supply voltages $V_{DD1}$ to $V_{DD3}$ are supplied to the CPU 20. Each of the supply voltages $V_{DD4}$ and $V_{DD5}$ is supplied to the peripheral circuits 50. The peripheral circuits 50 may include a random access memory (RAM), a hard disk drive, etc.

The power-on key 60 is a main power switch of the electronic device 1r. For example, when a user presses down the power-on key 60, the electronic device 1r is powered on/off. In order to prevent a malfunction of the power-on key 60, the electronic device 1r is powered on/off if the power-on key 60 is pressed and held for a predetermined time period.

A real time clock (RTC) 202 is disposed in the CPU 20. The CPU 20 determines whether the power-on key 60 has been pressed and held for a predetermined time period using clock signals (also referred to as calendar clocks) generated by the RTC 202. If so, the CPU 20 asserts the power-on signal PWRON for the PMIC 10. Once the power-on signal PWRON is asserted, the PMIC 10 initiates generating the supply voltages $V_{DD1}$ to $V_{DD5}$.

In the electronic device 1r of FIG. 1, the CPU 20 is required to determine whether the power-on key 60 has been turn on or off before the supply voltages $V_{DD1}$ to $V_{DD3}$ are applied thereto. To this end, the CPU 20 has a terminal at which the system voltage $V_{SYS}$ is directly applied. One of the circuit blocks of the CPU 20 that determines whether the power-on key 60 has been pressed is applied with the system voltage $V_{SYS}$.

Some circuit blocks of the CPU 20 that receive the supply voltages $V_{DD1}$ to $V_{DD3}$ may be completely shut down while the supply voltage $V_{DD}$ is terminated, and thus, these circuit blocks of the CPU 20 consume almost zero power. On the other hand, one circuit block of the CPU 20 that determines whether the power-on key 60 has been pressed is required to be operating all the time. Accordingly, the CPU 20 of the electronic device 1r cannot entirely be shut down and thus consuming power.

In addition, as the system voltage $V_{SYS}$ is selected from the battery voltage $V_{BAT}$ or the DC voltage $V_{DC}$, e.g., between 3 V to 5 V, it is higher than other supply voltages $V_{DD1}$ $V_{DD3}$ applied to the CPU 20, e.g., 1.5 V, 1.8 V and 3.5 V. Accordingly, a circuit block of the CPU 20 that generates the power-on signal PWRON is operated with the system voltage $V_{SYS}$ although it can be operated with a lower power voltage, e.g., 1.5 V. As a result, more power than necessary is consumed.

SUMMARY

In view of the above, an aspect of the present disclosure provides a power management circuit capable of reducing overall system power consumption.

According to one embodiment of the present disclosure, provided is a power management circuit. The power management circuit controls a plurality of power circuits that generates supply voltages at least for a processor. The power management circuit includes: a real time clock that generates clock signals with a predetermined frequency; a power-on terminal to which a power-on key is connected, wherein the power-on terminal receives a voltage whose level depends on whether the power-on key is pressed or not; a power-on detecting unit that monitors a voltage at the power-on terminal and asserts a start signal if it is determined using the clock signals that the power-on key is pressed and held for a predetermined time period; and a power management controller that receives a system voltage based on a battery voltage or a DC voltage from a DC power source and, upon the start signal is asserted, starts up the plurality of power circuits in a predetermined sequence using the clock signals.

According to this embodiment, a real time clock is disposed in the power management circuit instead of the processor and is connected to the power-on key. As such, the power management circuit can determine whether the power-on key has been pressed and held on its own, without the aid of the processor. By doing so, it is possible to completely stop supplying power to the processor in the standby state where the power-on key is to be monitored before the device is powered on. As a result, the overall power consumption of the system can be saved. Additionally, if the real time clock is disposed in the processor, an additional oscillator for sequence control has to be disposed in the power management circuit. In contrast, according to this embodiment, the real time clock can also be used as an oscillator for sequence control, and thus it is possible to eliminate one oscillator from the overall system.

The power management controller may cancel starting-up based on the power-on key when the DC voltage is not applied and the battery voltage is lower than a first predetermined threshold value.

By doing so, it is possible to prevent the battery from becoming an overly discharged state that may be occurred when the system starts up in a low voltage state and the battery is discharged.

The power management circuit may further include an interface circuit that receives start-up data indicative of a start-up time from the processor; and a memory that stores therein the start-up data received by the interface circuit. The power management controller starts up the plurality of power circuits in a predetermined sequence at the time indicated in the start-up data.

By doing so, it is possible to schedule an automatic start-up from the standby state such that the processor is completely shut down even during the standby time period until the automatic start-up. Accordingly, power consumption can be saved.

The power management controller may shut down the plurality of power circuits in a predetermined sequence upon receiving a shut-down signal to instruct to shut down the plurality of power circuits from the processor.

If the battery voltage is lower than a second threshold value, the power management controller may notify the processor of it.

By doing so, the processor can prompt a user of the electronic device to charge the battery via a display screen or a voice output.

If the battery voltage becomes lower than the second threshold value while the plurality of power circuits is shut down, the power management controller may notify the processor after starting up the plurality of power circuits in a predetermined sequence.

By doing so, it is possible to prompt a user to charge the battery even though the battery becomes low voltage in the standby state.

The power management circuit may further include an interface circuit configured to receive shut-down data indicative of a shut-down time from the processor; and a memory configured to store therein the shut-down data received by the interface circuit. The power management controller may shut down the plurality of power circuits in a predetermined sequence at the time indicated in the shut-down data By doing so, it is possible to schedule an automatic shut-down from the power-on state to the standby state.

The power management circuit may further include a battery terminal connected to a secondary battery; a DC input terminal that receives a DC voltage; and a charging circuit that charges the secondary battery using the DC voltage.

The power management circuit may further include the plurality of power circuits controlled by the power management controller.

The power management circuit may be integrated within a semiconductor substrate.

As used herein, the phrase "circuit integrated within a semiconductor substrate" may indicate that all of the circuit elements are formed on the semiconductor substrate, and that main circuit elements are integrated within the single semiconductor substrate, with some resistors, capacitors and the like used for adjusting circuit constants that may be formed outside the semiconductor substrate.

By integrating the circuit as a single IC, the area of the circuit can be saved while characteristics of circuit elements can be uniformly maintained.

According to another embodiment of the present disclosure, provided is an electronic device. The electronic device may include the power management circuit discussed above.

According to another embodiment of the present disclosure, provided is an electronic device. The electronic device includes: a battery; a processor; a peripheral circuit; and the power management circuit discussed above. The power management circuit receives a battery voltage from the battery or a DC voltage from a DC power source, generates a plurality of supply voltages for the processor and the peripheral circuit, and charges the battery using the DC voltage.

It is should be understood that any combinations of the elements described above, as well as the elements and expressions interchangeably used for describing methods, devices, systems and so on, are also construed as aspects of the present disclosure.

DETAILED DESCRIPTION

Figure 1:
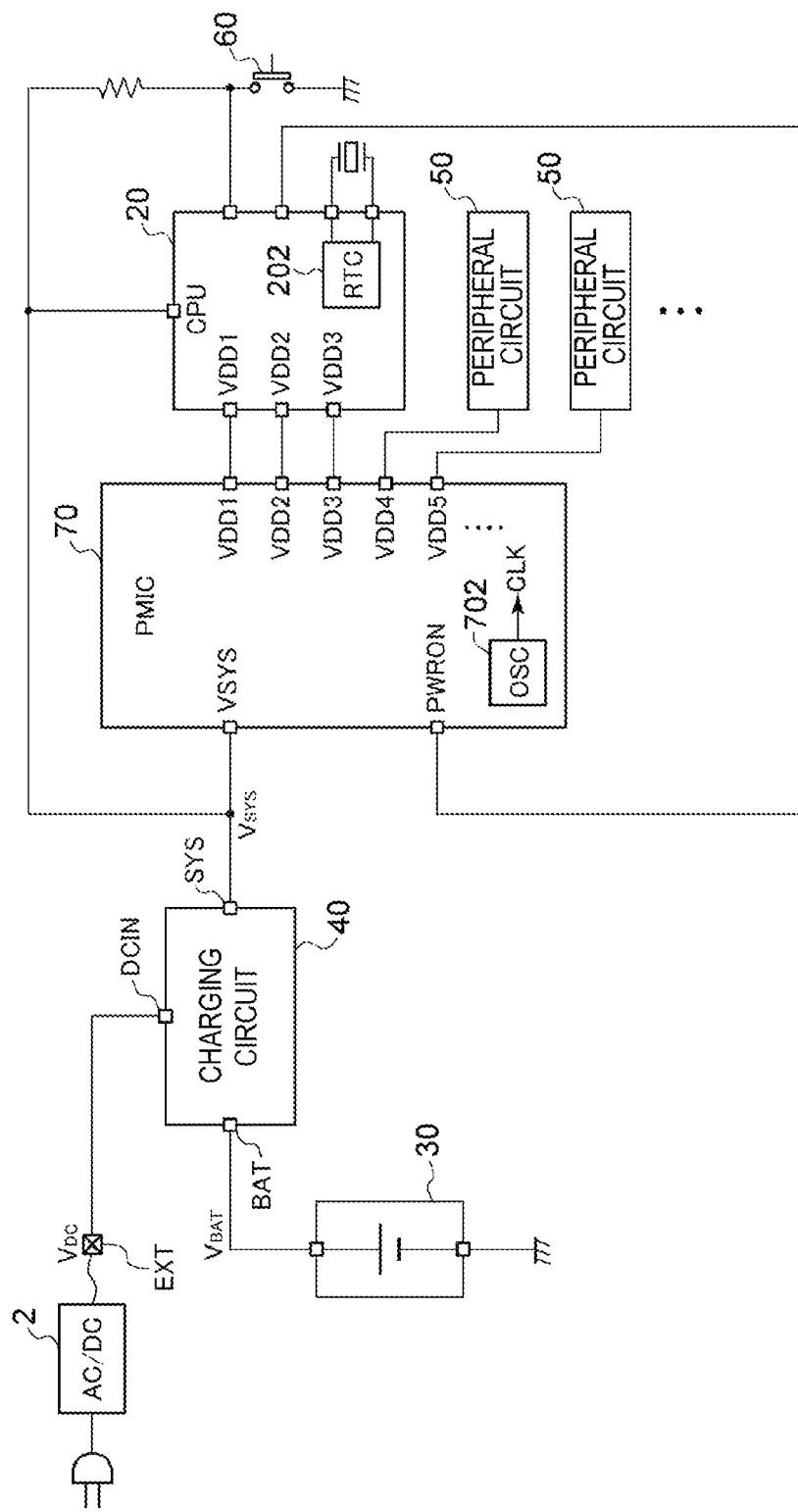
FIG. 1 is a block diagram of an electronic device.

Hereinafter, various embodiments of the present disclosure will be described below in detail with reference to the accompanying drawings. Throughout the drawings, the same or similar elements, members, and processes are denoted by the same reference numerals and redundant descriptions thereof may be omitted. The disclosed embodiments are provided for the purpose of illustration, not limitation, of the present disclosure, and all features and combinations thereof described in the embodiments should not be necessarily construed as describing the gist of the present disclosure.

As used herein, the expression "a member A is connected with a member B" may mean that the member A is physically and directly connected with the member B, and that the member A is indirectly connected with the member B via another member which does not electrically affect the connection. Similarly, the expression "a member C is disposed between a member A and a member B" may indicate that the member A is directly connected to the member C or member B is directly connected to member C, and that the members are indirectly connected via another member which does not electrically affect the connection.

Figure 2:
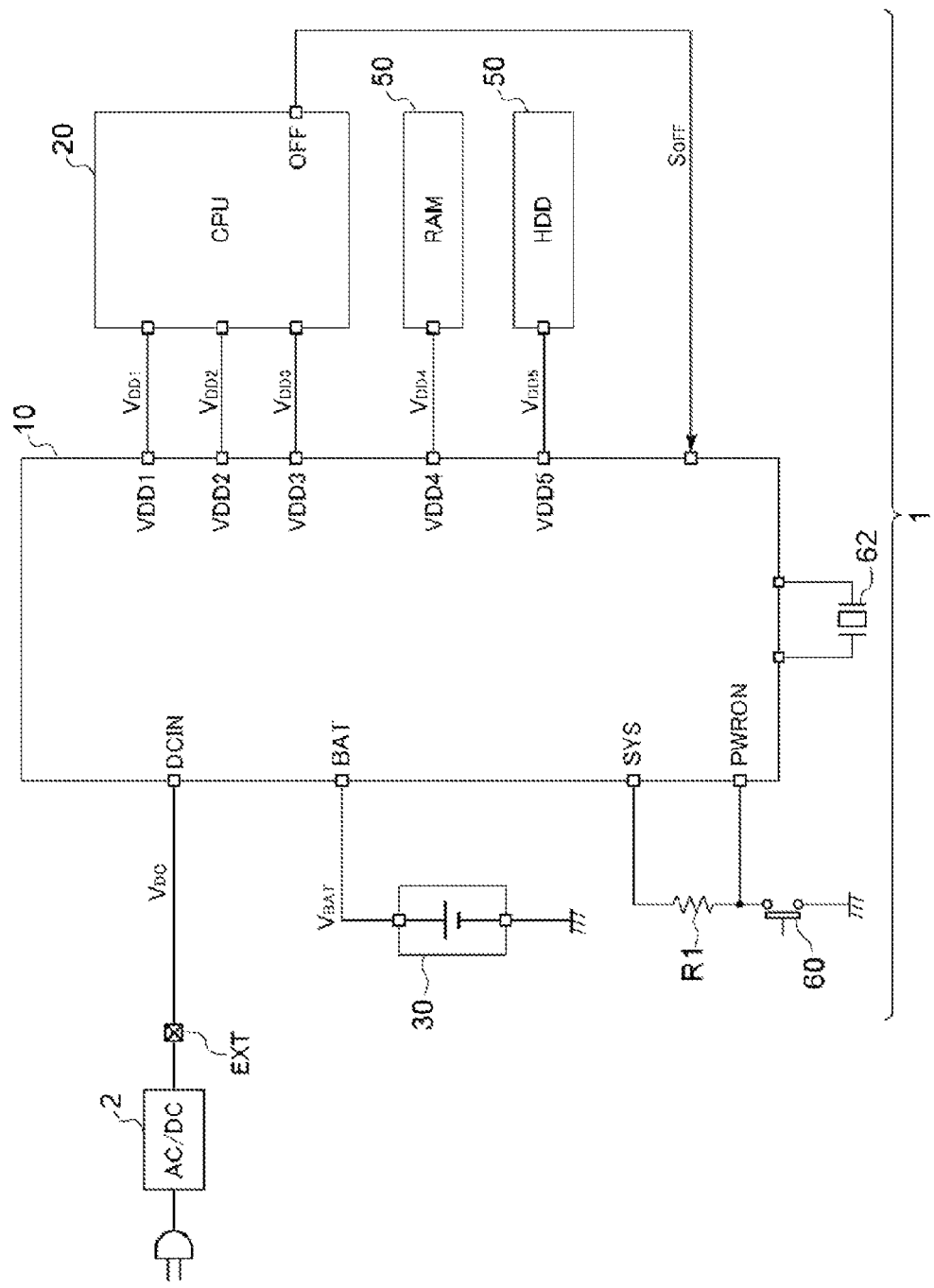
FIG. 2 is a block diagram of an electronic device employing a PMIC according to one embodiment of the present disclosure.

FIG. 2 is a block diagram of an electronic device 1 including a power management IC (PMIC) 10 according to one embodiment of the present disclosure. The electronic device 1 includes a PMIC 10, a CPU 20, a battery 30, a plurality of peripheral circuits 50 and a power-on key 60.

The battery 30 may be a secondary battery such as a lithium-ion battery, a nickel-hydrogen battery, etc., and output a battery voltage $V_{BAT}$. An external DC power source 2 is detachably connected to the electronic device 1 such that a DC voltage $V_{DC}$ is supplied. The DC power source 2 may be an AC adaptor or a USB host.

The CPU 20 may be a processor configured to control overall operations of the electronic device 1. The CPU 20 is divided into a plurality of circuit blocks. The supply voltage $V_{DD}$ applied to each of the circuit blocks is individually controlled by the PMIC 10. In a power supply state, only the supply voltage $V_{DD1}$ may be applied to the CPU 20. In another power supply state, the supply voltages $V_{DD1}$ and $V_{DD2}$ may be applied to the CPU 20. In still another power supply state, all of the supply voltages $V_{DD1}$ to $V_{DD3}$ may be applied to the CPU 20.

The plurality of peripheral circuits 50 includes a random access memory (RAM), a hard disk drive, a solid state drive (SSD), etc., and may receive the supply voltages $V_{DD4}$ and $V_{DD5}$ for operation.

The number of supply voltages applied to the CPU 20 and the peripheral circuits 50 are not limited to that shown in FIG. 2 but may vary with the sizes of the CPU and the system.

The PMIC 10 will be described below. According to the exemplary embodiment of the present disclosure, the PMIC 10 is a function IC in which the PMIC 70 and the charging circuit 40 shown in FIG. 1 are integrated. The functionalities of the PMIC 10 will be described below.

(Charging)

At the DC input terminal DCIN of the PMIC 10, the DC voltage $V_{DC}$ from the DC power source 2 is received. The PMIC 10 is operable to charge the battery 30 by using the DC voltage $V_{DC}$.

(Voltage Selection)

The PMIC 10 selects one from the battery voltage $V_{BAT}$ and the DC voltage $V_{DC}$ and outputs the system voltage $V_{SYS}$ via the system terminal SYS. The system voltage $V_{SYS}$ is used as a power supply voltage for circuits inside the PMIC 10. The system voltage $V_{SYS}$ may be applied to a circuit (not shown) outside the PMIC 10.

(Supply Voltage Generation)

The PMIC 10 generates supply voltages $V_{DD1}$, $V_{DD2}$, ..., $V_{DDN}$ with regulated voltage levels based on the system voltage $V_{SYS}$ and applies them to the CPU 20 and the peripheral circuits 50. That is, the PMIC 10 includes a plurality of power circuits for generating the plurality of supply voltages $V_{DD1}$, $V_{DD2}$ ... $V_{DDN}$.

(Sequence Control)

To correctly start up and shut down the system, the PMIC 10 manages a plurality of power supply states. Further, as a power supply state transitions from one to another, the PMIC 10 is required to start up the plurality of power circuits in a predetermined sequence at a predetermined time interval (timing) or shut down the plurality of power circuits in a predetermined sequence. The PMIC 10 includes a sequencer and a state machine (also referred to as a power management controller) for starting up and shutting down the plurality of power circuits.

The sequence control may require time management and timing control. The PMIC 0 includes a real time clock for managing time. The PMIC 10 is connected to a crystal oscillator 62 as an oscillator for the real time clock.

(Power-on Key Monitoring)

A power-on key 60 is connected to the power-on terminal PWRON of the PMIC 10. Specifically, the power-on key 60 is connected between the power-on terminal PWRON and a ground. A resistor R1 is connected between the power-on terminal PWRON and the system terminal SYS. The potential of the power-on terminal PWRON is pulled down to the ground potential, i.e., 0 V when a user of the electronic device 1 presses the power-on key 60. On the other hand, when the power-on key 60 is not pressed, the potential of the power-on terminal PWRON is pulled up to the system voltage $V_{SYS}$ by means of the resistor R1. That is, the voltage changed according to whether the power-on key 60 is pressed or not is input to the power-on terminal PWRON.

The PMIC 10 determines whether the power-on key 60 is pressed or not based on the voltage $V_{PWRON}$ at the power-on terminal PWRON. If the power-on key 60 is pressed and held for a predetermined time period, the PMIC 10 sequentially starts up the power circuits in a predetermined sequence at a predetermined time interval.

Figure 3:
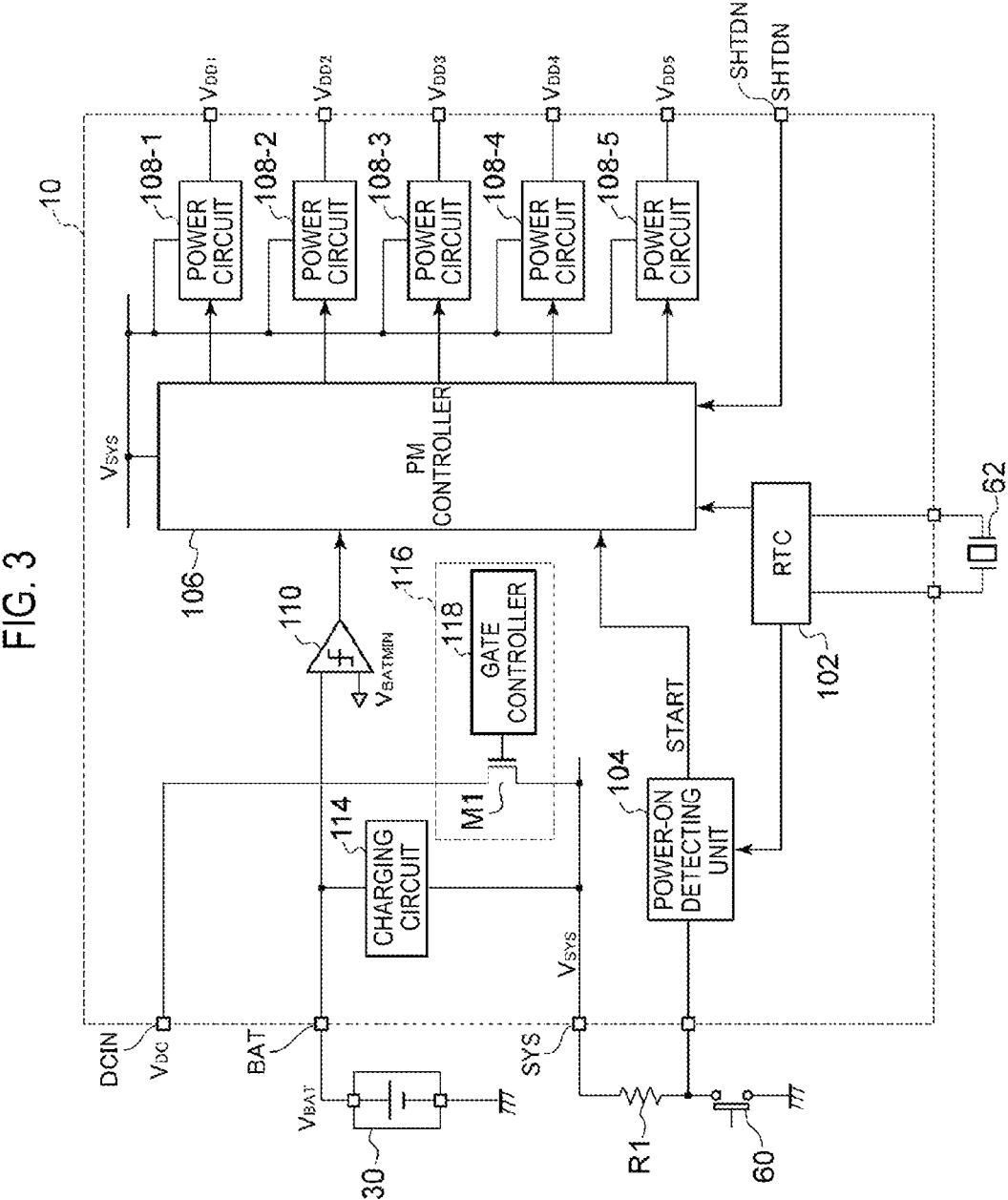
FIG. 3 is a block diagram of the PMIC in FIG. 2.

The overall configuration of the electronic device 1 has been described above. Hereinafter, a specific configuration of the PMIC 10 will be described. FIG. 3 is a block diagram of the PMIC 10 shown in FIG. 2.

The PMIC 10 includes a RTC 102, a power-on detecting unit 104, a PM controller 106, a plurality of power circuits 108, a first comparator 110, a charging circuit 114, and a protection switch 116.

Each of the plurality of power circuits 108_1 to 108_5 receives the system voltage $V_{SYS}$ to generate a plurality of supply voltages $V_{DD1}$ to $V_{DD5}$. The power circuits 108 include a step-up DC/DC converter, a step-down DC/DC converter, a step-up/step-down DC/DC converter, a charge pump circuit, a linear regulator such as an LDO (Low Drop Output) regulator, etc. An inductor or a smoothing capacitor of the DC/DC converter is attached to the outside of the PMIC 10, although not shown in FIG. 3.

The RTC 102 generates clock signals with a predetermined frequency. In addition, the RTC 102 may generate calendar data indicative of second, minute, hour, day, month, and/or year. The calendar data may be referred by the circuit blocks of the PMIC 10, e.g., the PM controller 106 or the power-on detecting unit 104. The frequency of the clock signals (hereinafter referred to as calendar clocks) CK generated by the RTC 102 may be about tens of kHz.

The power-on detecting unit 104 monitors the voltage $V_{PWRON}$ at the power-on terminal PWRON and asserts a start signal START (e.g., high level) if the power-on key 60 has been pressed and held for a predetermined time period (hereinafter referred to as determination time period τ) by utilizing the calendar clocks CK. The determination time period τ is on the order of several seconds, e.g., 2 seconds.

The power-on detecting unit 104 may determine whether the determination time period t has elapsed by referring to the calendar data of the RTC 102. Alternatively, the power-on detecting unit 104 may determine whether the determination time period τ has elapsed by counting calendar clocks generated by the RTC 102.

The charging circuit 114 and the protection switch 116 may be circuit blocks corresponding to the charging circuit 40 shown in FIG. 1.

The protection switch 116 is connected to the DC power source 2 and is turned on (connected) when a normal DC voltage $V_{DC}$ is input to the terminal DCIN. When the protection switch 116 is turned on, the DC voltage $V_{DC}$ is output from the terminal SYS.

The protection switch 116 includes a transistor M1 and a gate controller 118. The transistor M1 is connected between the terminal DCIN and the terminal SYS. The gate controller 118 controls the gate voltage of the transistor M1. The gate controller 118 and the transistor M1 may serve as a regulator that regulates the voltage $V_{SYS}$ at the terminal SYS to a predetermined voltage level when the protection switch 116 is turned on. In addition, the protection switch 116 may have overcurrent protection capabilities for adjusting the gate voltage of the transistor M1 such that a current flowing in the transistor M1 does not exceed an overcurrent threshold value.

While a DC voltage $V_{DC}$ within a normal voltage range is applied, the charging circuit 114 charges the battery 30 in a constant current (CC) manner and in a constant voltage manner alternately, using the system voltage $V_{SYS}$ based on the power from the DC power source 2.

The protection switch 116 is turned off (blocked) when the DC power source 2 is not connected to the PMIC 10, or when the DC voltage $V_{DC}$ is in an overvoltage state or a low voltage lock-out state even if the DC power source 2 is connected to the PMIC 10. In this case, a switch in the charging circuit 114 turns into the fully-on state, and the battery voltage $V_{BAT}$ at the BAT terminal is applied to the terminal SYS, contrary to when the protection switch 116 is turned on.

That is, the charging circuit 114 and the protection switch 116 serve as a selector that selects one from the DC voltage $V_{DC}$ and the battery voltage VABT to output it to the terminal SYS. In other words, the system voltage $V_{SYS}$ is substantially identical to the DC voltage $V_{DC}$ (or a voltage which is regulated to a predetermined level based on the DC voltage $V_{DC}$) and one side of the battery voltage $V_{BAT}$.

The conditions under which the charging circuit 114 and the protection switch 116 select from the DC voltage $V_{DC}$ and the battery voltage $V_{BAT}$ are not particularly limited herein, since the conditions may be various. For example, the DC voltage $V_{DC}$ may be selected first while the DC voltage $V_{DC}$ is being supplied. For another example, depending on the voltage level of the battery voltage $V_{BAT}$ or a load current, one or both of the DC voltage $V_{DC}$ and the battery $V_{BAT}$ may be selected.

A plurality of DC power sources 2 may be connected to the electronic device 1. One DC power source may be a USB host, and another DC power source may be an AC adaptor. In this case, a plurality of DC voltages $V_{DC}$ is supplied to the protection switch 116.

The PM controller 106 controls starting up and shutting down sequences and the timings. Specifically, the PM controller 106 receives the system voltage $V_{SYS}$ and, upon the signal START being asserted, sequentially starts up the plurality of power circuits 108_1 to 108_5 in a predetermined sequence and at a predetermined time interval using calendar clocks CK.

The first comparator 110 compares the battery voltage $V_{BAT}$ with a first threshold value (minimum start-up voltage $V_{BATMIN}$). For example, the minimum start-up voltage $V_{BATMIN}$ is equal to 3.5 V. The PM controller 106 cancels the starting-up according to the power-on key 60 when the DC voltage $V_{DC}$ is not supplied and the battery voltage $V_{BAT}$ is lower than the minimum start-up voltage $V_{BATMIN}$.

A shut-down signal SHTDN from the CPU 20 is input to a shut-down terminal SHTDN of the PMIC 10. The CPU 20 asserts the shut-down signal SHTDN when the user of the electronic device 1 instructs to shut down the device. When the shut-down signal SHTDN is asserted, the PM controller 106 shuts down the plurality of power circuits 108_1 to 108_5 in a predetermined sequence.

Figure 4:
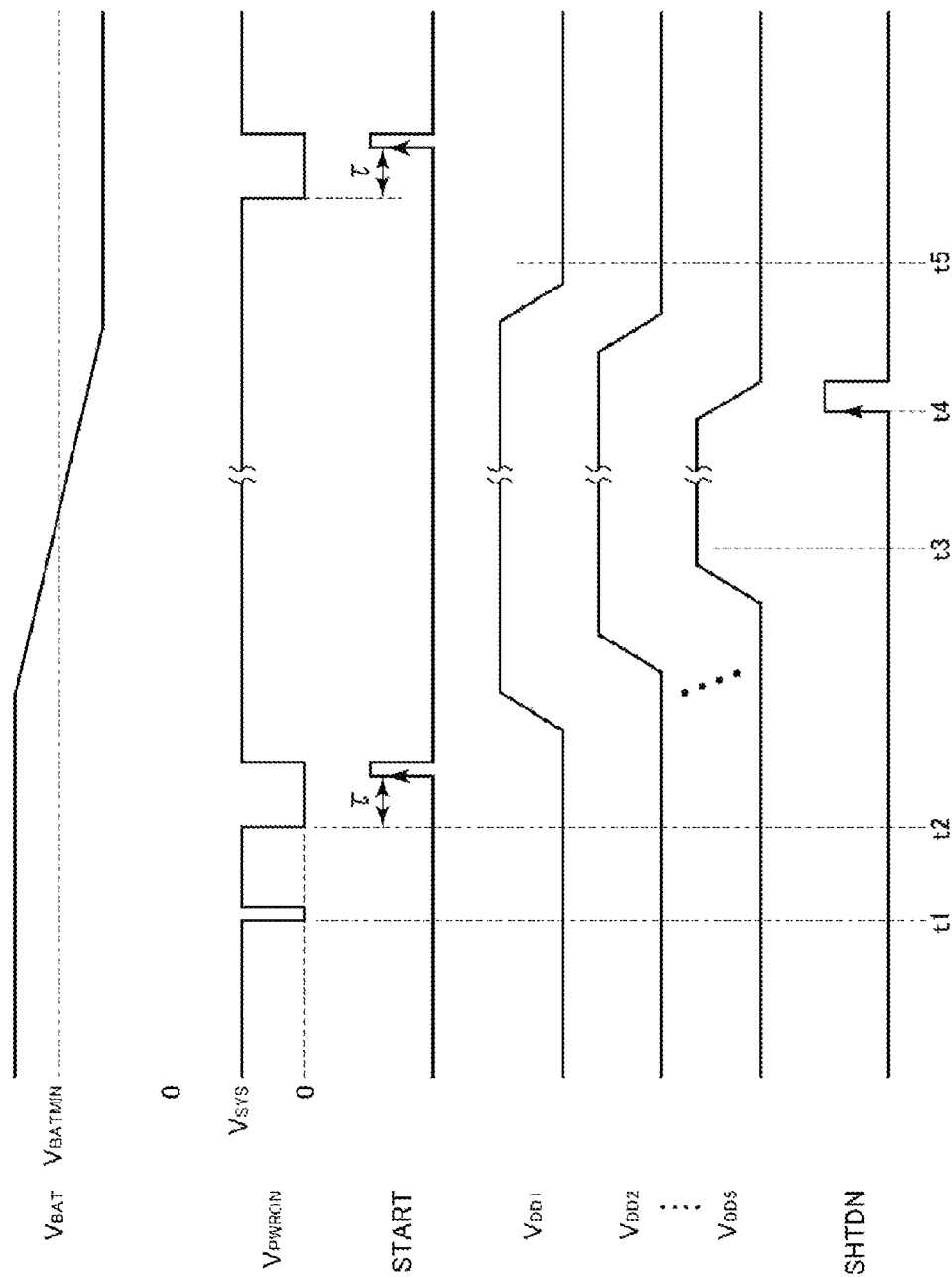
FIG. 4 is an operation waveform diagram of the electronic device according to one embodiment of the present disclosure.

The configuration of the PMIC 10 according to one embodiment of the present disclosure has been described above. The operation of the PMIC 10 will be described in detail below. FIG. 4 is a diagram showing operation waveforms of the electronic device 1 according to one embodiment of the present disclosure.

Prior to time t1, the electronic device 1 is in a standby state (also referred to as a shut-down state). At time t1, when the power-on key 60 is pressed, the voltage $V_{PWRON}$ at the terminal PWRON becomes low level. The time period for which the power-on key 60 is pressed is shorter than the determination time period τ, and thus the signal START is not asserted. If the power-on key 60 is pressed and held until time t2 for the time period longer than the determination time τ, the signal START is asserted. Accordingly, the plurality of power circuits $V_{DD1}$ to $V_{DD5}$ is sequentially started.

When all of the power circuits 108 are increased at time t3, the electronic device 1 becomes ready to be operated by a user.

At time t4, the user operates the electronic device 1 for instructing to shut down the electronic device 1. By doing so, the signal SHTDN is asserted, and the power voltages $V_{DD1}$ to $V_{DD5}$ are stopped in a reverse order from the order that the power voltages $V_{DD1}$ to $V_{DD5}$ are started at the starting time. At time t5, all of the power circuits 108 are shut down to turn into the standby state.

At time t6, if the power-on key 60 is pressed and held for longer than the determination time period τ, the signal START is asserted once again. At this time, since the battery voltage $V_{BAT}$ is lower than the minimum start-up voltage $V_{BATMIN}$, the PM controller 106 does not start up the plurality of power circuits 108 even if the signal START is asserted.

The operation of the electronic device 1 has been described above. The merits of the electronic device 1 will be described in detail below.

In the electronic device 1 according to one embodiment of the present disclosure, the RTC 102 is disposed in the PMIC 10 other than the CPU 20 and the PMIC 10 is connected to the power-on key 60. In this manner, the PMIC 10 can determine whether the power-on key 60 has been pressed and held on its own, without the aid of the CPU 20. Accordingly, it is possible to completely stop supplying power to the CPU in the standby state where the power-on key 60 is monitored before the device is powered on. As a result, overall power consumption of the system can be saved.

If the RTC 202 is disposed in the CPU 20 as shown in FIG. 1, the oscillator 702 for sequence control has to be additionally disposed in the PMIC 70. In contrast, in the PMIC 10 according to one embodiment of the present disclosure, the RTC 102 can also be used as an oscillator for sequence control, and thus it is possible to eliminate one oscillator from the overall system. As a result, power consumption can be saved during the normal operation, and cost can be reduced as well.

In addition, in the PMIC 10 according to the exemplary embodiment of the present disclosure, when the DC voltage $V_{DC}$ is not applied thereto and the battery voltage $V_{BAT}$ is lower than the minimum start-up voltage $V_{BATMIN}$, the starting-up according to the power-on key 60 is cancelled. By doing so, it is possible to prevent the battery 30 from becoming an overly discharged state that may be occurred when the system starts up in a low voltage state and the battery 30 is discharged.

The present disclosure has been described with reference to the embodiments. It should be understood by those skilled in the art that the above embodiments are merely examples and a variety of modifications may be made to combinations of the elements and processes disclosed herein, and that such modifications also fall within the scope of the present disclosure. Hereinafter, such modifications are described.

(First Modification)

Figure 5:
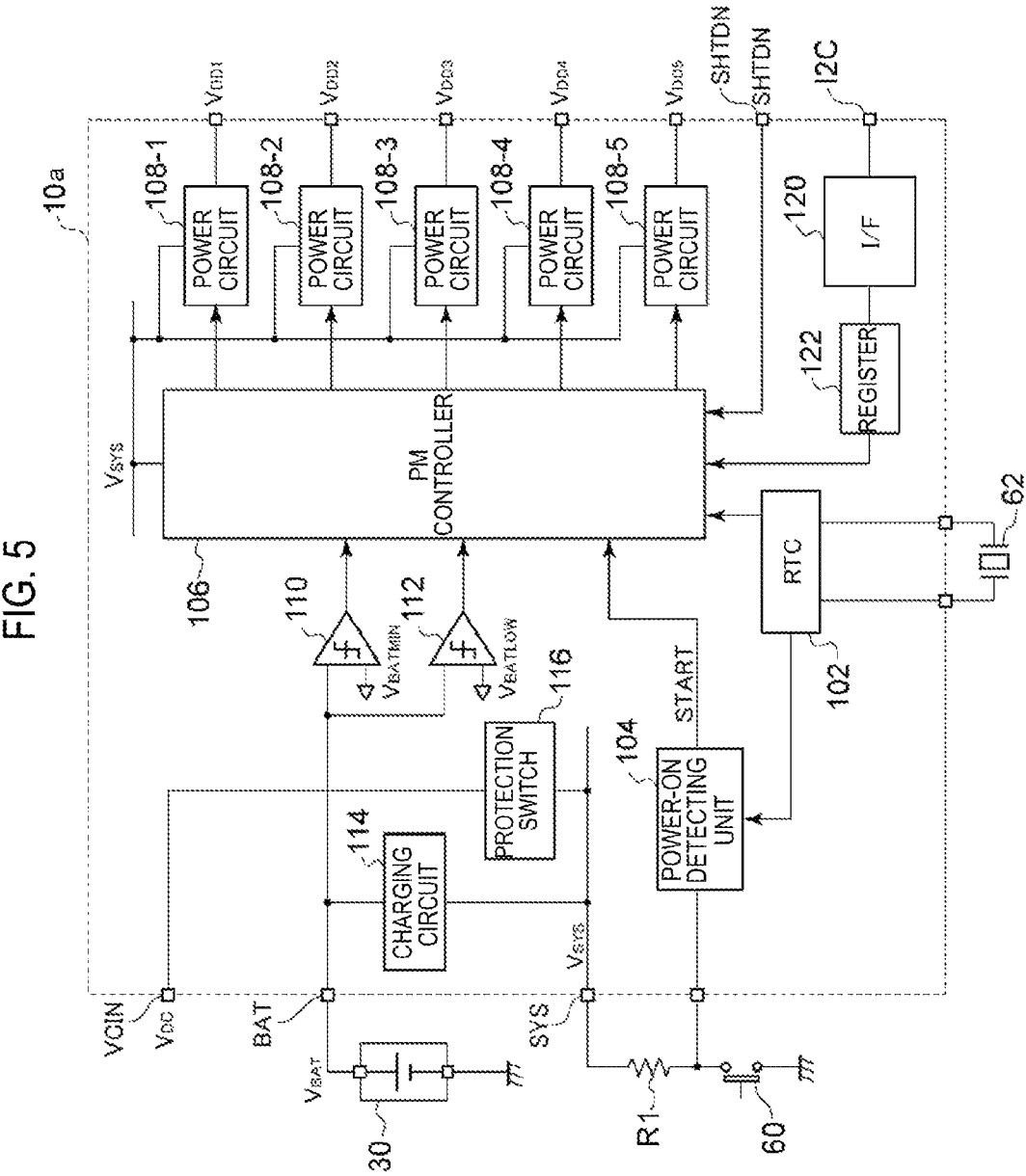
FIG. 5 is a block diagram of a PMIC according to a first modification of the present disclosure.

FIG. 5 is a block diagram of a PMIC 10a according to a first modification of the present disclosure. The PMIC 10a further includes a second comparator 112, an interface circuit 120 and a register 122, in addition to the elements of the PMIC 10 shown in FIG. 3.

The interface circuit 120 is disposed to send/receive data to/from the CPU 20. For example, the interface circuit 120 may be a serial interface using an Inter IC (I2C) bus. Alternatively, the interface circuit 120 may be a parallel interface.

The second comparator 112 compares the battery voltage $V_{BAT}$ with a second threshold value (set voltage $V_{BATLOW}$). When the battery voltage $V_{BAT}$ is lower than the set voltage $V_{BATLOW}$, the PM controller 106 notifies the CPU 20 of it via the interface circuit 120. For example, the voltage $V_{BATLOW}$ may be lower than the voltage $V_{BATMIN}$, approximately 3.3 V.

By doing so, upon receiving the notification indicating that the battery voltage $V_{BAT}$ is low, the CPU 20 can prompt a user of the electronic device 1 to charge the battery via a display screen or a voice output.

In one embodiment, if the battery voltage $V_{BAT}$ becomes lower than the set voltage $V_{BATLOW}$ in the standby state where the power circuits 108_1 to 108_5 are shut down, the PM controller 106 may notify the CPU 20 of the low battery state after the power circuits 108_1 to 108_5 have been started up in a predetermined sequence.

By doing so, it is possible to prompt a user to charge the battery by forcibly starting up the system even if the battery becomes low voltage in the standby state.

In this modification, the interface circuit 120 receives start-up data indicative of a start-up time from the CPU 20. The start-up data received by the interface circuit 120 is stored in a memory, e.g., the register 122.

The PM controller 106 refers to the calendar data of the RTC 102 and starts up the power circuits 108_1 to 108_5 in a predetermined sequence at the time indicated in the start-up data.

By doing so, it is possible to schedule automatic start-up from the standby state. In addition, since the PMIC 10 is completely shut down even during the standby time period until the automatic start-up, power consumption can be saved.

Alternatively or additionally to the start-up data, the interface circuit 120 may receive from the CPU 20 shut-down data indicative of a shut-down time of the system. The shut-down data is stored in the register 122.

The PM controller 106 refers to the calendar data of the RTC 102 and shuts down the power circuits 108_1 to 108_5 in a predetermined sequence at the time indicated in the shut-down data.

By doing so, it is possible to schedule automatic shut-down from the power-on state to the standby state.

(Second Modification)

In the above-described embodiment, the PMIC 10 is integrated with the charging circuit 114, the protection switch 116 and the plurality of power circuits 108_1 to 108_5. However, the present disclosure is not limited thereto. For example, the charging circuit 114 and the protection switch 116 may be integrated with the charging circuit 40 other than the PMIC 10 as shown in FIG. 1. Alternatively, the plurality of power circuits 108_1 to 108_5 may be disposed outside the PMIC 10.

(Applications)

Figure 6:
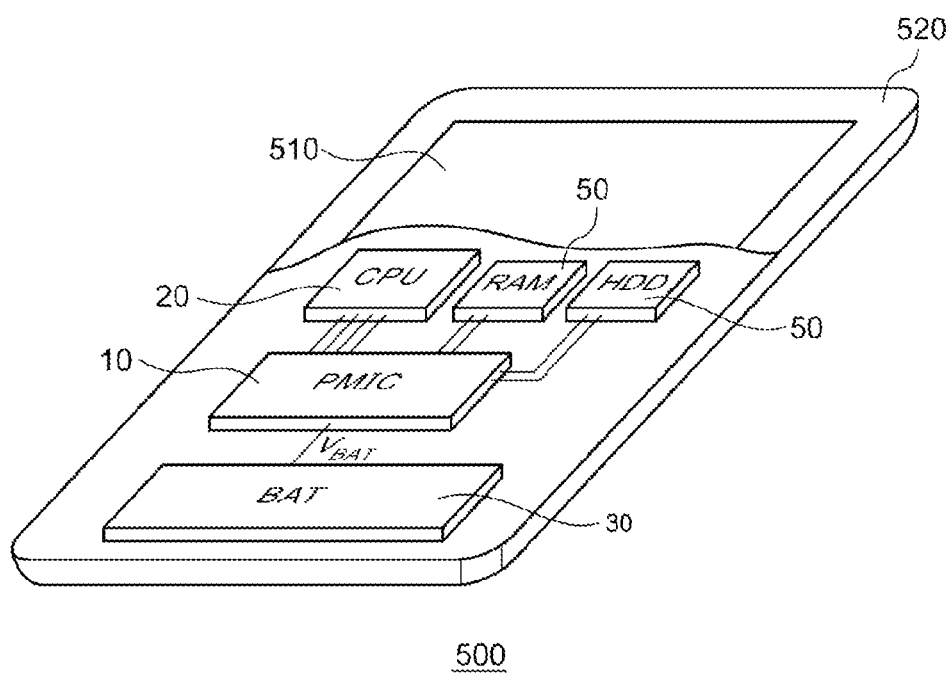
FIG. 6 is a perspective view of an electronic device including the PMIC according to one embodiment of the present disclosure.

Lastly, applications of the PMIC 10 will be described. FIG. 6 is a perspective view of an electronic device 500 employing the PMIC 10. The electronic device 500, for example, may be a tablet terminal or a smart phone. In a housing 520, peripheral circuits 50 such as a CPU 20, a RAM, a HDD, etc., a secondary battery 30, and the PMIC 10 are accommodated. The PMIC 10 may provide power supply voltage to a display panel 510, its driver, an audio circuit, etc., in addition to the CPU 20 and the peripheral circuits 50. The electronic device 500 may also be a laptop, a console game device, a portable game device, a wearable PC, a portable audio player, a digital camera, etc.

The PMIC 10 according to one embodiment of the present disclosure is especially advantageous if the battery 30 is detachable from the electronic device. For the electronic device 1 with the undetachable battery 30, once the battery 30 is installed in the electronic device 500 during the manufacturing process, the battery cannot be charged after release until a user uses it. If such an electronic device 500 employs the system shown in FIG. 1, while the electronic device 500 is in the standby state, a part of the CPU 20 is still operating, and thus the battery 30 continues to be discharged. Accordingly, when a user purchases the device at first time, the battery may be in low voltage state such that it may not be operable.

In contrast, in the electronic device 500 according to one embodiment of the present disclosure, the electronic device 500 is released with the CPU 20 that is completely shut down, and thus overall system power consumption is significantly reduced. Accordingly, a user can use the electronic device 500 as soon as she/he purchases it without charging it.

As will be appreciated, the PMIC 10 can be applied to an electronic device employing a detachable battery 30 of battery pack type, to save power consumption.

In addition, since power consumption of the overall system can be reduced in the standby state, the PMIC 10 according to one embodiment of the present disclosure is especially advantageous for use in an electronic device with low power consumption by the CPU 20 in the standby state, such as an electronic book or a wearable device. Instead of using the PMIC 10, the charging circuit 40 and the power circuit 22 may be installed as separate components According to the present disclosure in some embodiments, it is possible to reduce power consumption of the overall system.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power management circuit for controlling a plurality of power circuits to generate power supply voltages at least for a processor, the power management circuit comprising:
   a real time clock that generates clock signals with a predetermined frequency;
   a battery terminal connected to a secondary battery;
   a DC input terminal that receives a DC voltage;
   a charging circuit that charges the secondary battery using the DC voltage;
   a protection switch connected to the DC input terminal, and connected in parallel to the charging circuit;
   a system terminal connected to a terminal of a power-on key having another terminal connected to a ground, the charging circuit and the protection switch;
   a power-on terminal connected to the terminal of the power-on key, which is connected to the system terminal, wherein a potential of the power-on terminal is pulled down to the ground potential when the power-on key is pressed, and the potential of the power-on terminal is pulled up to a system voltage when the power-on key is not pressed;
   a power-on detecting unit that monitors a voltage at the power-on terminal based on the system voltage and asserts a start signal if it is determined using the clock signals that the power-on key is pressed and held for a predetermined time period before the processor is powered on; and
   a power management controller that selects a first voltage corresponding to the DC voltage as the system voltage when the DC voltage is supplied to the DC input terminal, selects a second voltage corresponding to a secondary battery voltage as the system voltage when the DC voltage is not supplied to the DC input terminal, and, upon the start signal being asserted, starts up the plurality of power circuits in a predetermined sequence using the clock signals,
   wherein the system terminal supplies the system voltage to the power-on key.

2. The power management circuit of claim 1, wherein the power management controller cancels starting-up based on the power-on key when the DC voltage is not applied and the secondary battery voltage is lower than a first predetermined threshold value.

3. The power management circuit of claim 1, further comprising:
   an interface circuit that receives start-up data indicative of a start-up time from the processor; and
   a memory that stores therein the start-up data received by the interface circuit,
   wherein the power management controller starts up the plurality of power circuits in a predetermined sequence at the time indicated in the start-up data.

4. The power management circuit of claim 1, wherein the power management controller shuts down the plurality of power circuits in a predetermined sequence upon receiving a shut-down signal to instruct to shut down the plurality of power circuits from the processor.

5. The power management circuit of claim 1, wherein if the secondary battery voltage is lower than a second threshold value, the power management controller notifies the processor.

6. The power management circuit of claim 5, wherein if the secondary battery voltage becomes lower than the second threshold value while the plurality of power circuits is shut down, the power management controller notifies the processor after starting up the plurality of power circuits in a predetermined sequence.

7. The power management circuit of claim 1, further comprising:
   an interface circuit configured to receive shut-down data indicative of a shut-down time from the processor; and
   a memory configured to store therein the shut-down data received by the interface circuit,
   wherein the power management controller shuts down the plurality of power circuits in a predetermined sequence at the time indicated in the shut-down data.

8. The power management circuit of claim 1, further comprising the plurality of power circuits controlled by the power management controller.

9. The power management circuit of claim 1, wherein the power management circuit is integrated within a semiconductor substrate.

10. An electronic device comprising the power management circuit of claim 1.

11. An electronic device comprising:
    a battery;
    a processor;
    a peripheral circuit; and
    the power management circuit of claim 1, wherein the power management circuit receives a battery voltage from the battery or a DC voltage from a DC power source; generates a plurality of supply voltages for the processor and the peripheral circuit; and charges the battery using the DC voltage.

12. The power management circuit of claim 1, wherein the protection switch includes a transistor connected between the DC input terminal and the system terminal and a gate controller controlling a gate voltage of the transistor.

* * * * *